June 9, 1964
C. D. FISHER
3,136,141
DRIVE SHAFT COUPLING
Filed May 8, 1962
4 Sheets-Sheet 1
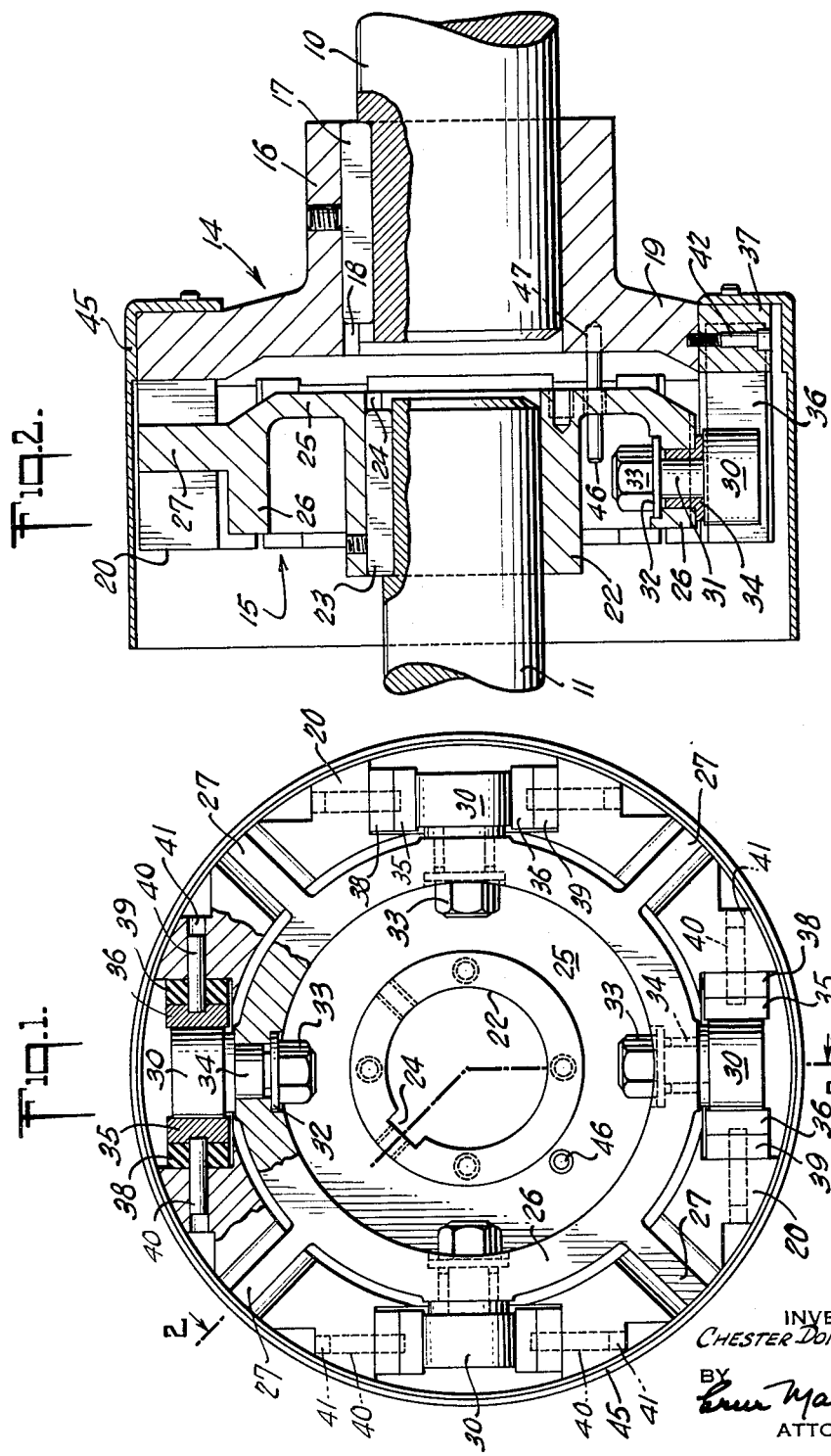
INVENTOR
CHESTER DONALD FISHER
BY
ATTORNEY June 9, 1964 C. D. FISHER 3,136,141
DRIVE SHAFT COUPLING
Filed May 8, 1962 4 Sheets-Sheet 2
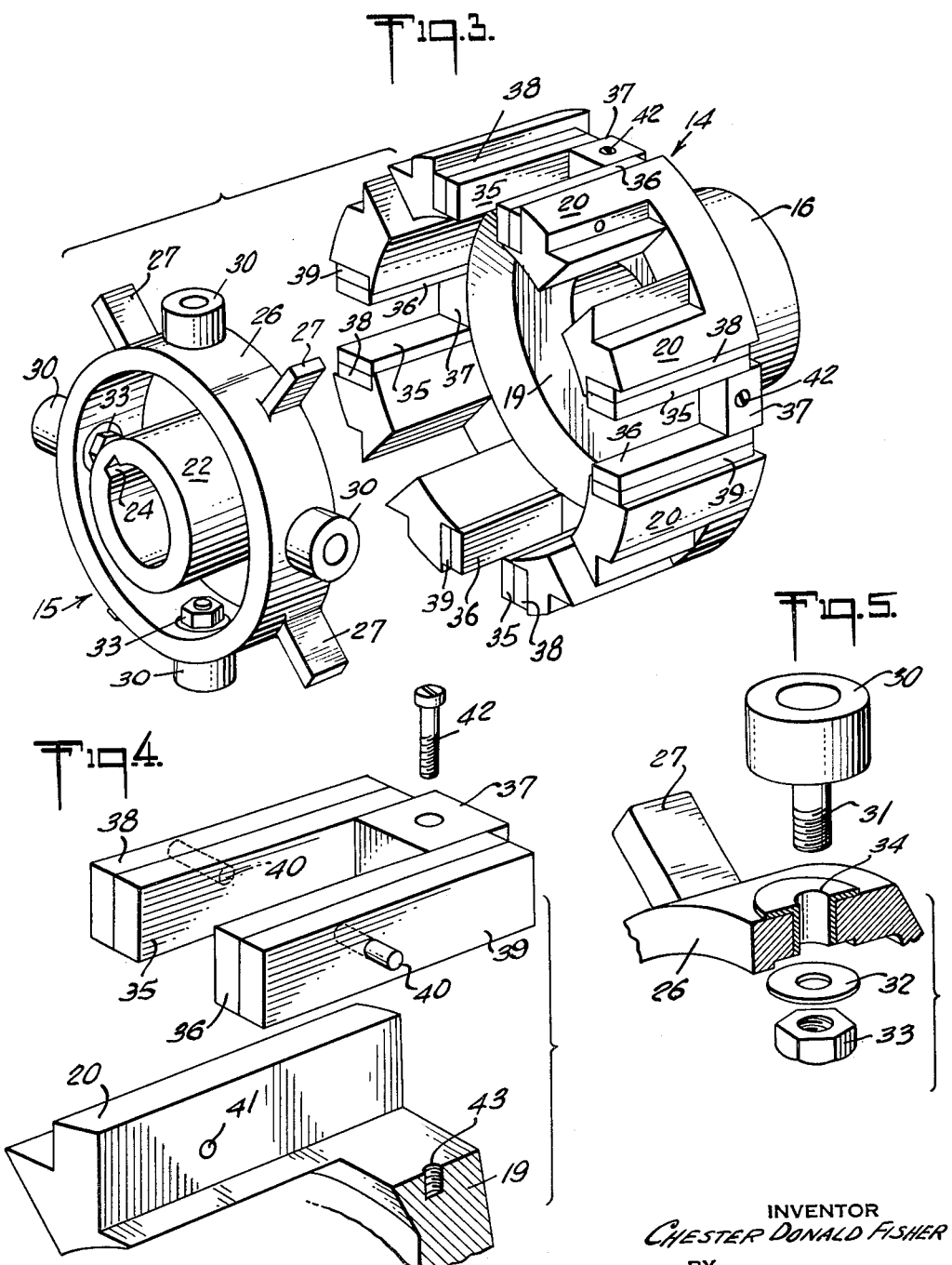
INVENTOR
CHESTER DONALD FISHER
BY
ATTORNEY June 9, 1964 C. D. FISHER 3,136,141
DRIVE SHAFT COUPLING
Filed May 8, 1962 4 Sheets-Sheet 3

INVENTOR
CHESTER DONALD FISHER
BY
ATTORNEY

June 9, 1964  C. D. FISHER  3,136,141
DRIVE SHAFT COUPLING
Filed May 8, 1962  4 Sheets-Sheet 4

INVENTOR
CHESTER DONALD FISHER
BY
ATTORNEY

United States Patent Office 3,136,141
Patented June 9, 1964

3,136,141
DRIVE SHAFT COUPLING
Chester Donald Fisher, Muncy, Pa., assignor to Sprout, Waldron & Company, Inc., Muncy, Pa., a corporation of Pennsylvania
Filed May 8, 1962, Ser. No. 193,289
7 Claims. (Cl. 64—8)

This invention relates to drive couplings for the driving interconnection of a rotating drive shaft with a rotatable shaft to be driven thereby and, more particularly, to such couplings constructed to accommodate substantial free axial movement of the driven shaft during driving engagement with the coupling, with a minimum of frictional resistance and without transmitting undesired axial thrust forces to the drive shaft.

In the design and construction of various sorts of machinery for various purposes, situations arise where it is desired to have a power-producing drive shaft (such as the shaft of an electric motor) connected to the power-input driven shaft of the machinery by a readily demountable or releasable coupling mechanism. If the operation of the driven machine is such as produces axial thrust or even actual axial movement with the driven shaft, such axial thrust forces will be transmitted to the motor or drive shaft by conventional couplings. If the drive shaft is mounted in the motor in conventional sleeve bearings, substantial axial thrust forces may be intolerable or disruptive of the motor operation. Similarly, the substantial extra expense and complication of arranging thrust-resistant bearings in the motor design may be either economically intolerable or otherwise undesired.

Merely as illustrative of some types of machines generally which may produce such axial thrust as a concomitant of the operation thereof, one may note rotary attrition mills and like grinding devices where the very grinding operation for which the rotary power is supplied in the first place produces an inevitable axial thrust on the driven shaft, such as, for example, in a double disk grinding or attrition mill as disclosed in copending application Serial No. 9,758, filed February 19, 1961, now Patent No. 3,038,673. Furthermore, with some machines or devices an actual and substantial axial movement of the driven shaft may be both necessary and desired even during rotating driving engagement, such as in the attrition mill or grinding devices as disclosed in copending application Serial No. 46,457, filed August 1, 1960, now abandoned and with such axial movement intended to be substantially greater than can be conveniently or conventionally accommodated in the drive motor design.

If it is attempted to accommodate such thrust forces or axial movements and to insulate the motor drive shaft therefrom by using conventional couplings involving axially slidable surfaces of the coupling parts to result in virtually metal-to-metal contact therebetween and a concomitantly increased frictional or other resistance to axial movement. Thus, despite free axial movement between driving and driven coupling elements when the coupling is at rest, a substantial resistance to axial movement may occur during driving rotation of the couplings so as to fail to insulate the drive shaft completely from axial thrust forces imposed on the driven shaft and/or to inhibit free axial movement thereof. Even if it is possible to reduce thrust forces transmitted axially by the coupling to within limits which are readily accommodated by the bearing arrangement of the drive shaft or motor, additional difficulty may be experienced with machinery or apparatus, such as that noted above, where complete and substantially free axial movement is desired and/or where any substantial amount of resistance to such movement produced by the coupling creates a further undesired disadvantage in the operation of the entire machine.

According to this invention, by contrast, there are provided rotating drive coupling constructions and arrangements having substantially no appreciable resistance to axial movement between driving and driven coupling parts even when the cooperating coupling elements are subject to the full driving torque, with such arrangements illustrated by the provision of a plurality of torque-transmitting elements in the form of radially extending rollers cooperating with axial races whereby frictional or other resistance to axial movement of the respective driving and driven coupling parts is reduced to virtually inappreciable levels and below that of even prior tooth-and-jaw arrangements with full lubrication. As further features of this invention, there are also provided resilient torque-transmitting elements for accommodating minor misalignments or uneven wear factors and to provide and maintain uniform torque transmission throughout all the driving engagements of the coupling; as well as independent adjustment means for the various torque-transmitting rollers for individual adjustment thereof with respect to the various cooperating axial races; and a radially expanded disposition of the parts to minimize the driving torque acting on each individual torque-transmitting element even during rotating driving conditions at maximum torque and high horsepower. Thus, minimized resistance to axial movement between driving and driven coupling parts is assured for virtually complete insulation of the drive shaft from thrust forces transmitted through the coupling and, also, for virtually complete elimination of resistance within the coupling to desired free axial movements of the driven shaft even under rotating drive conditions of maximum torque transmitted thereto.

With the foregoing and other objects in mind, this invention will be explained in more detail, and other objects and advantages thereof will be apparent from the following description, the accompanying drawings, and the appended claims.

In the drawings:

FIG. 1 is a view in elevation and partly broken away of a coupling embodying and for practicing this invention viewed from the driven side thereof;

FIG. 2 is an axial section taken along the line 2—2 of FIG. 1;

FIG. 3 is an exploded perspective view of the driving and driven torque-transmitting portions of the coupling of FIG. 1;

FIGS. 4 and 5 are exploded views on a somewhat larger scale of details of the coupling of FIG. 3;

Figure 6:
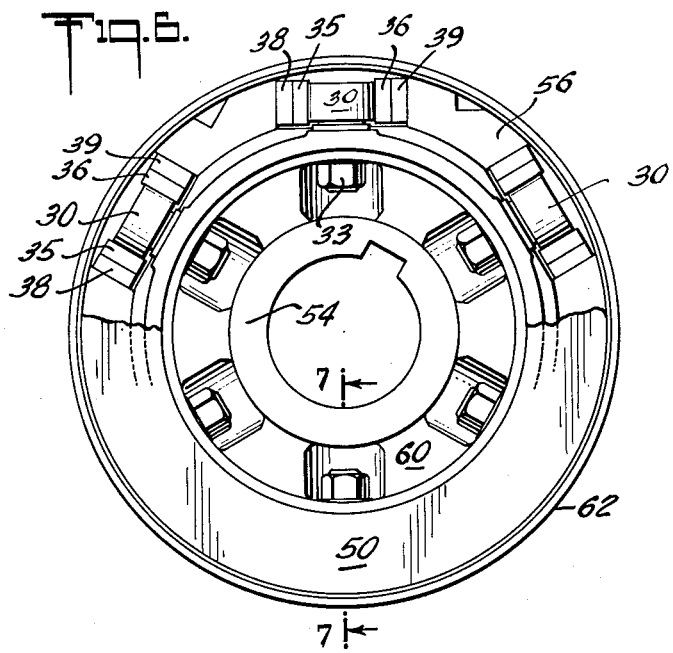
FIG. 6 is a view in elevation and partly broken away, similar to FIG. 1, of a further coupling embodying and for practicing this invention.

Referring to the drawings, in which like reference numerals relate to like parts throughout the several views thereof, a coupling embodying and for practicing this invention is illustrated as interconnecting a drive shaft 10 with a driven shaft 11 for rotary driving engagement. As indicated in FIG. 3, such coupling comprises a driving portion 14 and a separate driven portion 15. Driving portion 14 includes a hub 16 keyed or otherwise affixed to drive shaft 10 for rotation therewith, as by a key indicated at 17 engaging a keyway 18, and includes a radially extending flange member 19 around the periphery of which are axially extending ribs 20. The axial length of ribs 20 is defined by the greatest extent of axial movement to be accommodated by the coupling between driven shaft 11 and drive shaft 10, and it is the spaces between ribs 20 which engage torque-transmitting members on driven portion 15.

Driven portion 15 of the illustrated coupling includes a hub 22 for mounting on driven shaft 11 and means such as key 23 in keyway 24 for affixing hub 22 to driven shaft 11 in driving engagement therewith. A radially extending flange 25 is formed at the end of hub 22 adjacent drive portion 14 of the coupling, which flange carries around the periphery thereof an annular band 26 of an outer diameter somewhat less than the inner diameter defined by the various ribs 20 on drive portion 14. Radially protruding from band 26 are a plurality of stationary fingers 27 and a plurality of roller members 30 for receiving driving torque transmitted from drive portion 14 and for providing substantially free axial movement of driven portion 15 with respect to drive portion 14 in the illustrated device.

Roller members 30 are mounted for free rotation on threaded shafts 31 (in known manner and satisfactorily similar to conventional cam follower rollers), by means of which the various roller members are mounted around annular band 26 and held in place thereon as by washers 32 and nuts 33, as indicated more particularly in FIG. 5. Preferably, such mounting includes an eccentric bushing 34 in annular band 26 whereby fine adjustment of the precise angular positioning of each roller member 30 is achieved by loosening nut 33 and twisting eccentric bushing 34 to achieve the precise adjustment desired, as explained in more detail below.

Smooth and positive transmission of torque from drive portion 14 to driven portion 15 and in either direction of rotation of the illustrated coupling, as well as substantially free axial movement of driven member 15 with respect to drive member 14, are achieved in accordance herewith by engagement of the various roller members 30 in axial races formed in the spaces between adjacent axial ribs 20 on drive member 14. That is, ribs 20 preferably have the general cross-sectional configuration indicated in FIGS. 3 and 4, to receive between adjacent ribs 20 a race assembly comprising parallel bars 35 and 36, separated by spacing member 37, and with each of the bars preferably backed by resilient pads 38 and 39 of rubber or plastic or the like. Preferably pilot or locating pins 40 extend outwardly from each of the bars 35 and 36 and through each of resilient pads 38 and 39 to be received in holes 41 of ribs 20. As so assembled, as in FIGS. 3 and 4, and with spacer 37 affixed to the outer edge of flange 19 as by bolts 42 engaging threaded borings 43 in flange 19, the race is ready to receive one of the roller members 30 therein. As will be understood, resilient pads 38 and 39 are provided as further assurance of smooth torque transmission from ribs 20 to plates 35 and 36 and thence to rollers 30, and to accommodate for slight misalignments, just as the adjustment provided by eccentric bushing 34 permits precise positioning of each respective roller member 30 with respect to the particular race assembly into which it is to be engaged.

In the embodiment illustrated in FIGS. 1–3, four roller members 30 are shown, with a corresponding number of race assemblies between adjacent ribs 20. The additional radially extending fingers 27 are received in those spaces between axial ribs 20 which are not occupied by race assemblies 35—42. In this manner, as will be understood, driven portion 15 of the coupling is axially assembled with and into drive portion 14, as shown in FIG. 2, for the smooth torque-transmitting driving engagement therewith. An outside covering or casing 45 may also be provided around the outside of the assembly, and a locating pin 46 for engagement through flange 25 and into a hole 47 in flange 19 may also be included as a marking or guide means for the angular positioning of driven portion 15 with respect to drive portion 14.

As will be apparent from the foregoing, with the driving and driven portions 14 and 15 assembled as indicated in FIGS. 1 and 2, rotation of drive shaft 10 results in a smooth transmission of torque uniformly around the coupling from the axial ribs 20 through each of the respective races 35, 36 to each of the roller members 30, and through them and band 26 directly to driven shaft 11. Furthermore, the provision of rotating roller members 30 retained in open axial races 35, 36 permits substantially free axial movement of driven portion 15 with respect to drive portion 14 even during maximum torque-transmitting rotational drive and free of the difficulties encountered in other types of couplings where the diminishing of resistance between driving and driven parts depends upon the existence of a film of lubricant to avoid actual metal-to-metal contact, especially at the side of the axially sliding elements where the driving rotation is urging the elements together.

Merely by way of illustration, in a tooth-and-jaw type of coupling (such as disclosed in copending application Serial No. 46,457 noted above), the coefficient of friction between axially slidable elements of the coupling may be of the order of about 0.2. Even with lubrication (and more especially when driving torque in one direction squeezes the film of lubricant out from between the axially slidable teeth and jaws), such an arrangement produces an appreciable resistance to free axial movement, resulting in either transmitting axial thrust through the coupling to the driving shaft or interfering with the free axial movement of the driven shaft as desired to achieve the freely "floating" advantage of the driven shaft.

With the illustrated device, by contrast, a coefficient of friction of only about 0.01 between roller members 30 and the metal plates 35 or 36 is required or results in rotation of roller members 30 about the individual axes 31 thereof to produce substantially decreased resistance to any axial movement of driven portion 15 with respect to driving portion 14, and without reliance on lubrication between driving and driven parts to decrease the frictional or other resistance to axial movement. Furthermore, in the illustrated construction the actual areas of contact between roller members 30 and races 35—36—i.e., the areas through which torque is transmitted—are radially much further from the axis of drive shaft 10, so that the force on each individual roller member 30 is correspondingly less for the same amount of total torque being transmitted. For example, in a coupling as illustrated where the radius to the members 30 is about twice that of the radius to the torque-transmitting elements of a coupling as disclosed in the above mentioned copending application, the force on each roller member 30 is approximately half that on the coacting teeth and jaws of the prior coupling, and the resistance to axial movement even under maximum torque of the illustrated device is reduced to about 1/40 or 1/50 of the resistance of the prior coupling under comparable circumstances.

Also as will be understood, the illustrated construction is substantially independent of the particular direction of rotation of drive shaft 10, and resilient pads 38 and 39 are preferably provided to accommodate any misalignments due to wear or other reasons and to aid in securing an equal transmission of load through the various roller members 30, each of which is similarly independently adjustable for accurate positioning within its respective race for uniformity of torque transmission and axial movement.

Furthermore, in the designing and manufacture of a coupling embodying and for practicing this invention, the particular number of individual rollers members 30 and their cooperating races 35—36 will be coordinated, as well understood, with the torque desired to be transmitted, as well as with other factors. As illustrative, for example, of larger couplings including six or eight torque-transmitting roller elements, the embodiments illustrated in FIGS. 6–9 have produced satisfactory results in accordance herewith.

Figure 7:
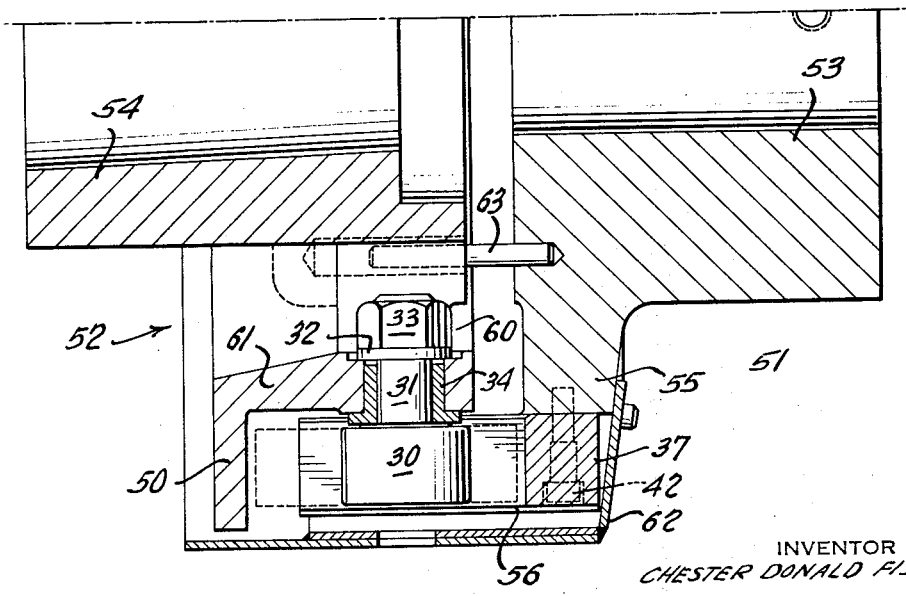
FIG. 7 is a partial axial section on the line 7—7 of FIG. 6.

Regarding the six-roller coupling of FIGS. 6 and 7, for example, a view similar to FIG. 1 is shown of a coupling having six roller members 30. In this embodiment, an annular cover 50 is shown extending from band 61 merely to cover the roller members, while leaving exposed and accessible for adjustment the various nuts 33. That is, the disclosed arrangement includes a drive member indicated generally at 51 and a driven member indicated at 52, each of which has hubs 53 and 54 respectively. A flange 55 from driving hub 53 carries axially extending ribs 56 between adjacent ones of which are formed races by bars 35—36 with backing strips 38—39 to engage roller members 30, as with the embodiment previously described. Driven hub 54 includes a flange 60 from which extends annular band 61, carrying roller members 30 in bushing 34 and held in place by nuts 33 in substantially the manner previously described for the mounting of such roller members through annular band 26 of the structure illustrated in FIGS. 1–5. An outer covering 62 is mounted on flange 55 of drive portion 51, and a locating pin 63 is preferably included as shown. As further illustrative of the invention, the extent of axial movement permitted is indicated in FIG. 7 by dotted line extreme positions of the roller member 30 illustrated.

Figure 8:
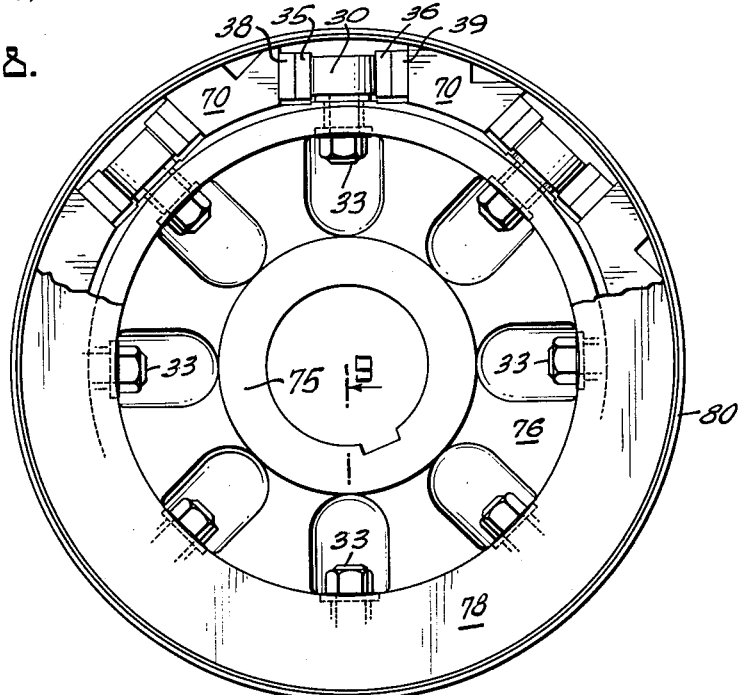
FIG. 8 is a view in elevation similar to FIG. 6 of a further coupling embodying and for practicing this invention.
Figure 9:
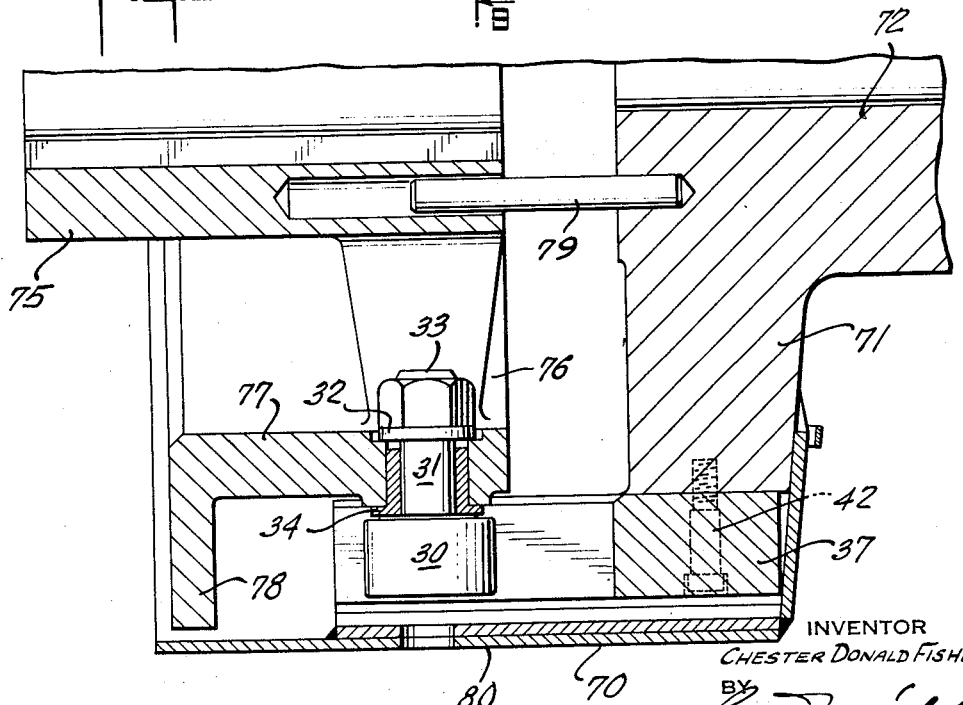
FIG. 9 is a partial axial section on the line 9—9 of FIG. 8.

As will be apparent, generally a similar situation is indicated in FIGS. 8 and 9 with regard to a coupling in which the torque is transmitted by eight roller members 30 engaged in races 35—36, etc., carried between axially extending arms 70 from a flange 71 mounted on driving hub 72. The driven element includes hub 75 carrying a flange 76, which has mounted around the periphery thereof annular band 77 and annular covering 78. The roller members 30 on shafts 31 are held in place by nuts 33 in bushings 34 as previously described. A locating pin 79 is indicated, as well as an outer covering or housing 80. As further illustrative, the position of the driving and driven parts illustrated in FIG. 9 shows them somewhat axially separated as is intended to occur in use.

Again, as merely illustrative, satisfactory results have been achieved with a coupling as illustrated in FIGS. 1–5 dimensioned to accommodate a motor drive shaft up to 4″ in diameter and delivering as much as 400 H.P. at 270 r.p.m., and providing a maximum axial movement under load of as much as 2⅛″. For higher power requirements of the order of 800 H.P. at 600 r.p.m., the six-roller structure of FIGS. 6 and 7 is preferred, and still provides a total axial movement of 2⅛″ under full load. The eight-roller structure of FIGS 8–9 accomodates a drive shaft diameter of up to about 6″ in hub 72, and a torque of as such as 10,500 foot pounds with a maximum axial movement under load of 3″ between the driving and driven portions.

Accordingly, as will be apaprent from the foregoing, there is provided herewith a variety of constructions and arrangements for drive shaft couplings of simple and economical construction through which positive and efficient torque transmission is obtained without frictional or other interference or resistance to axial movement or thrust force transmission of a driven shaft with respect to a drive shaft coupled thereto. Yet such advantages are obtained in accordance herewith in a manner which maintains a desirable mechanical and engineering simplicity of the device and does not interfere with the ease of uncoupling and separating driving and drive portions of the coupling structure as may be desired from time to time. Similarly, the reduction of frictional resistance to axial movement between driving and driven parts is controlled herewith substantially independently of the direction of rotation and while also providing simple and convenient means for maintainig the uiformity of torque transmission on various driving and driven parts of the coupling and for adjusting the torque in transmitting elements to maintain such driving uniformity and to accommodate wear or other inevitable minor misalignments in use.

While the structures and apparatus herein described constitute preferred embodiments of the invention, it is to be understood that the invention is not limited to these precise structures and apparatus, and that changes may be made therein without departing from the scope of the invention which is defined in the appended claims.

What is claimed is:

1. In a torque-transmitting drive coupling for connecting a driving and a driven shaft with accommodation of relative axial movements therebetween, the combination which comprises a first member for engagement with one of said shafts and including a plurality of axially extending projections spaced equally around the entire periphery thereof, said projections being circumferentially spaced forming a plurality of axial races between adjacent said projections, a second member for engagement with the other of said shafts and adapted for interfitting with said first member and said projections thereon for free axial movement with respect thereto when said members and said shafts are in coaxial alignment, a plurality of torque-transmitting elements on said second member equally spaced around the entire periphery thereof, said torque-transmitting elements including means for rolling bearing engagement in said races between said projections on said first member for receiving equal amounts of torque from each of said projections and transmitting said torque to said second member substantially without resistance to free axial movement thereof, and adjusting means on said second member for adjusting the precise positioning of said torque transmitting elements thereon with respect to the axial center lines of said races for maintaining said rolling bearing elements uniformly aligned in said races.

2. In a torque-transmitting drive coupling for connecting a driving and a driven shaft with accommodation of relative axial movements therebetween, the combination which comprises a first member for engagement with one of said shafts and including a plurality of axially extending projections spaced equally around the entire periphery thereof, said projections being circumferentially spaced forming a plurality of axial races between adjacent said projections, second member for engagement with the other of said shafts and adapted for interfitting with said first member radially and axially within said axial projections thereon for free axial movement with respect thereto when members and said shafts are in coaxial alignment, a plurality of torque-transmitting elements spaced equally around the entire periphery of said second member and projecting radially outwardly therefrom, said torque-transmitting elements including freely rotating means for rolling bearing engagement in said races between said projections for receiving equal amounts of torque from each of said races in said first member substantially without resistance to free axial movement thereof, a resilient cushioning layer in said races between said axial projections on said first member effecting smooth torque transmission between said axial projections and said elements, and adjusting means on said second member for adjusting the precise positioning of said torque-transmitting elements thereon with respect to the axial center lines of said races for maintaining said driven rolling bearing elements uniformly aligned in said races.

3. In a torque-transmitting drive coupling for connecting a driving and a driven shaft with accommodation of relative axial movements therebetween, the combination which comprises a driving member for engagement with said driving shaft and including a plurality of axially extending projections thereon, said projections being equally circumferentially spaced forming a plurality of axial races between adjacent said projections, a driven member for engagement with said driven shaft and adapted for interfitting with said driving member for free axial movement with respect thereto when said driving and driven members and said shafts are in coaxial alignment, and a plurality of torque-transmitting elements spaced equally around the entire periphery of said driven member, said torque-transmitting elements including freely rotating means for rolling bearing engagement in said races between said projections on said driving member for receiving equal amounts of torque from each of said projections and transmitting said torque to said driven member substantially without resistance to free axial movement between said members, and means for adjusting the precise angular positioning of said torque-transmitting elements on said driven member with respect to the axial centerlines of said races for maintaining each of said driven rolling bearing elements uniformly aligned in its respective said race.

4. Apparatus as recited in claim 3 in which said driven member fits radially and axially within the area defined by said axial projections on said driving member and in which said torque-transmitting elements project radially outwardly from said driven member for engagement in said races between said projections on said driving member.

5. Apparatus as recited in claim 3 which also includes a resilient cushioning layer along the sides of said races between said axial projections on said driving member for smooth torque transmission between said driving and driven members.

6. Apparatus as recited in claim 3 in which there is a greater number of said races on said driving member and a greater number of said torque-transmitting elements on said driven member when high torque is to be transmitted in a lower number of races and torque-transmitting elements when low torque is to be transmitted whereby each individual said torque transmitting element transmits only a small fraction of the total torque transmitted by said coupling.

7. Apparatus as recited in claim 3 in which said torque-transmitting elements engage said races at a substantial radius outwardly of said shafts for increasing the total torque transmitted by said coupling while minimizing frictional resistance to relative axial movements between said driving and driven members during torque transmission therebetween.

References Cited in the file of this patent
UNITED STATES PATENTS

| | | |
|---|---|---|
| 1,933,072 | Ricefield | Oct. 31, 1933 |
| 2,296,955 | Sherwell et al. | Sept. 29, 1942 |
| 2,386,754 | Snyder | Oct. 16, 1945 |
| 2,505,120 | Jackson | Apr. 25, 1950 |
| 2,598,938 | Philippe | June 3, 1952 |
| 2,787,144 | Chauvel | Apr. 12, 1957 |

FOREIGN PATENTS

| | | |
|---|---|---|
| 23,434 | Norway | June 9, 1913 |